Patented June 15, 1954

2,681,363

UNITED STATES PATENT OFFICE 2,681,363

HYDROXY PHENYL ALIPHATIC CARBOXYLIC ACIDS AND THEIR IODO DERIVATIVES AND PROCESS FOR PREPARING SAME

Erwin Schwenk, Shrewsbury, Mass., and Domenick Papa, Bloomfield, N. J., assignors to Schering Corporation, Bloomfield, N. J., a corporation of New Jersey No Drawing. Application March 19, 1951, Serial No. 216,461

1 Claim. (Cl. 260—521)

The present invention relates to the manufacture of 3,5-diiodo-4-hydroxy phenyl aliphatic carboxylic acids and their salts, esters and ethers, and to non-iodinated intermediates employed in making such compounds, and to a process for manufacturing the same.

The subject matter of the present application is taken in toto from our earlier applications, Serial No. 557,934, filed October 9, 1944, now abandoned, and Serial No. 3,182, filed January 19, 1948, now abandoned, Examples I to VIII of the present application, originating in Serial No. 557,934, while Examples IX to XIII originated in Serial No. 3,182.

The compounds of the invention are suitable for use in organic synthesis and in radiographic diagnosis, as well as bactericides and as internal antiseptics.

It is the general object of the invention to provide iodinated hydroxy phenyl aliphatic carboxylic acids and their salts, esters and ethers, and likewise intermediate non-iodinated acids of this general class which may be converted by iodination into iodo hydroxy phenyl aliphatic carboxylic acids.

The iodinated compounds of the invention may be prepared by treating hydroxy phenyl aliphatic, more specifically alkane, carboxylic acids, which may be prepared in the manner described herein below, with suitable iodinating agents, for example, an aqueous solution of potassium iodid and iodine, the reaction taking place under alkaline conditions.

The present invention contemplates also the manufacture of p-substituted phenyl aliphatic carboxylic acids and their iodo derivatives, in which the aliphatic radical is of the branched chain type. Such compounds can be prepared by the Perkin and modified Perkin reactions, including Reformatsky reaction. Thus a p-substituted aryl aldehyde like p-hydroxy or methoxy benzaldehyde may be reacted with an alkali metal salt of an aliphatic carboxylic acid. In accordance with the invention, the α-alkyl substituted p-hydroxy cinnamic acid is hydrogenated to saturate the aliphatic double bond, whereafter the product may be iodinated to produce ω-(3,5-diiodo-4-hydroxy phenyl)-substituted branched chain aliphatic carboxylic acids. The compounds obtained by this procedure have the branched alkyl group in the α-position to the carboxyl group; for example, when p-hydroxy benzaldehyde is reacted with potassium propionate and either acetic or propionic anhydride, there is formed α-methyl p-hydroxy cinnamic acid which, according to the invention, is hydrogenated to the corresponding α-methyl propionic acid compound. In similar fashion, when potassium butyrate and butyric anhydride are reacted with p-hydroxy benzaldehyde, there is formed the α-ethyl p-hydroxy cinnamic acid, which is then, in accordance with invention, hydrogenated to the corresponding α-ethyl propionic acid compound and thereafter iodinated.

By an alternative procedure, employing the Reformatsky reaction, the β-alkyl substituted compounds of the type indicated above may be prepared, which may subsequently be hydrogenated and iodinated to produce compounds suitable for roentgenographic diagnosis or for antisepsis or other therapeutic use. In this procedure an alkyl phenyl ketone having in p-position a substituted hydroxyl group, preferably a methoxy group, is reacted with a bromo aliphatic acid ester with the aid of zinc, magnesium or similarly acting metal. Thus when p-methoxy acetophenone is reacted with ethyl bromo acetate and zinc, there is obtained, after dehydration, saponification, reduction and demethylation, β-methyl β-(hydroxy phenyl) propionic acid. By the use of α-bromo ethyl propionate, the corresponding α,β-dimethyl β-(p-hydroxy phenyl) propionic acid can be obtained. Numerous other α- or β-halogenated aliphatic acid esters can be used in this reaction with ketones.

We have found that, especially for roentgenographic purposes, it is of advantage that the iodinated hydroxy compounds have a carbon number of the order of that of the higher fatty acids, that is, at least 10, as then the compounds are more compatible with the lipoid substances in the body; and that satisfactory solubilities for the acids or their neutralization products are obtained with compounds in which the alkane carboxylic acid group has as many as 18 carbons in the aliphatic side chain alone. The preferred compounds of the invention may accordingly be represented by the formula

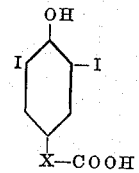

X—COOH and their salts and esters, and likewise their 4-substitution products which are convertible into 4-hydroxy compounds with the aid of hydrolysis, like the ether and ester derivatives, such as the 4-methoxy, acetoxy, propionoxy etc. compounds, X being an alkyl radical, straight or branched, of 3 or more carbon atoms. The intermediates for these iodinated compounds, namely the compounds

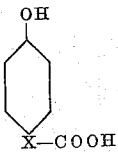

wherein X is as above defined, likewise fall within the scope of the present invention.

In its broader aspect, however, the invention embraces compounds of the general formula

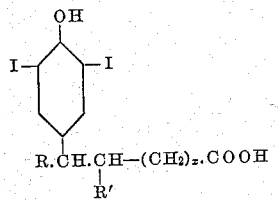

wherein one of R and R' is alkyl, while the other is hydrogen or alkyl, while $x$ may be 0 or an integer of any reasonable value, say up to 14 or so.

It is to be understood that these formulas embrace also the neutralization products (sodium, potassium and other metal and also amine, like diethanolamine, salts, and esters) as well as the 4-substituted compounds, as above described.

As already indicated, the compounds of the present invention may be prepared by a series of reactions which individually are known. Thus certain of the compounds may be prepared by way of the p-alkoxy aroyl-alkane carboxylic acid which in turn may be prepared by reacting the corresponding alkoxy benzene with a half ester chloride of a dicarboxylic aliphatic acid under known conditions. For example, the chloride of the monoethyl ester or of the monocarboethoxy derivative of the dicarboxylic acid $$COOH(CH_2)_{14}COOH$$

on reaction with anisole yields the ω-substituted aroyl alkane carboxylic acid. On the other hand, various branched-chain acids can be produced by the Perkin and Reformatsky reactions wherein a salt of an aliphatic acid is caused to react on a p-substituted aryl aldehyde, or wherein a brominated ester is caused to react upon an aryl aldehyde or on an aryl-alkyl ketone. Alkyl chains of various lengths and substituted by alkyl groups at various points can be obtained by suitably selecting the halogenated fatty acid ester. Thus by the use of a β-bromo derivative of an ethyl ester of a fatty acid having a straight chain of 3 or more carbon atoms with a benzaldehyde, a γ-aryl substituted butyric acid will be obtained and in similar fashion aryl γ-substituted and also aryl- and alkyl-substituted longer chain fatty acids may be prepared.

The p-hydroxy phenyl-substituted fatty acids of the invention may be converted into their salts, esters and ethers in known manner. The p-hydroxy group can for example be converted into an acyloxy group; while the metal and amine salts of the acids may be readily prepared and represent compounds which are generally more soluble in water than the free acids.

The invention will be described in greater detail with the aid of the following examples which, however, are presented for purposes of illustration only and not as indicating the scope of the invention.

EXAMPLE I

γ-(3,5-diiodo-4-hydroxyphenyl) butyric acid 40 g. of γ-(p-methoxy phenyl) butyric acid was refluxed for 6 hours with a mixture of 50 cc. of 1.48 HBr and 100 cc. acetic acid. The reaction mixture after pouring on ice, was filtered and recrystallized from water. The γ-(p-hydroxy phenyl) butyric acid separated as fine white needles melting at 110–111° C. 18 g. of the hydroxy acid was iodinated by dissolving it in approximately 800 cc. of N/2 sodium hydroxide to which was added a solution of about 50.8 g. of iodine and 50.8 g. of potassium iodide dissolved in 250 cc. of water. The addition is preferably made in the course of a half hour with stirring. After standing for awhile the reaction mixture was treated with a solution of bisulfite and then acidified with concentrated HCl. The precipitated diiodo hydroxy acid was obtained from either acetone and water or chloroform and petroleum ether as a white crystalline substance, melting at 105–106° C.

EXAMPLE II

ω-(3,5-diiodo-4-hydroxyphenyl) hexoic acid 44.4 g. of ω-(p-methoxy phenyl) hexoic acid were demethylated as described in Example I yielding the ω-(p-hydroxy phenyl) hexoic acid which melted at 107–108° C. 20.8 g. (0.1 m.) of this hydroxy acid was iodinated as described in Example I, and there was obtained ω-(3,5-diiodo-4-hydroxyphenyl) hexoic acid which melted at 117–118° C. after recrystallization from acetone and water.

EXAMPLE III

ω-(3,5-diiodo-4-hydroxyphenyl) capric acid

The ω-(p-methoxy benzoyl) pelargonic acid required for the preparation of the ω-(3,5-diiodo-4-hydroxyphenyl) capric acid was synthesized in the two following ways:

(a) Sebacic anhydride was reacted with anisole and anhydrous aluminum chloride, using carbon disulfide or acetylene tetrachloride as solvent (J. A. C. S. 54, 4105 (1932): J. Chem. Soc. 1092 (1935)). The reaction mixture was worked up in the known manner and the diketone separated from the keto acid by means of sodium carbonate. The keto acid was recrystallized from alcohol and melted at 100–101° C. Yield=25%.

(b) The alternative procedure for the preparation of ω-(p-methoxy benzoyl) pelargonic acid gives only the keto acid in very good yield. To an ice-cold mixture of 54 g. of anisole and 200 g. of carbon disulfide, there were added gradually and with stirring 75 g. of anhydrous powdered aluminum chloride. It is desirable to add the aluminum chloride slowly in order to avoid hydrolysis of the anisole to phenol. To this ice-cold mixture was then added, dropwise, 125 g. of ω-carboethoxy pelargonyl chloride. After the addition was complete, the mixture was stirred for a few hours and decomposed with ice and hydrochloric acid in the usual manner. The carbon disulfide layer was separated, and washed with water and dilute sodium bicarbonate. After removing the solvent, the residue was saponified with sodium hydroxide or carbonate and the acidic fraction freed from any neutral material by ether extraction. On acidification of the alkaline solution the ω-(p-methoxy benzoyl) pelargonic acid precipitated and was filtered. After recrystallization from benzene-petroleum ether, the melting point was 99–100° C. Yield 78%.

The ω-(p-methoxy benzoyl) pelargonic acid was reduced to the ω-(p-methoxy phenyl) capric acid via the Clemmensen reduction. It was found necessary to use large amounts of Zn amalgam and HCl with acetic acid as solvent for complete reduction. Isolated in known manner, the reduced acid melted at 68–69° C. after recrystallization from benzene-petroleum ether.

Demethylation of the ω-(p-methoxy phenyl) capric acid with hydrobromic and acetic acids as described in Example I, yielded the ω-(p-hydroxy phenyl) capric acid which melted at 99–100° C. after recrystallization from benzene-petroleum ether.

26.4 g. (0.1 m.) of ω-(p-hydroxy phenyl) capric acid was iodinated as described in Example I. The ω-(3,5-diiodo-4-hydroxy phenyl) capric acid was obtained in a yield of 49 g. melting at 79–80° C. after recrystallization from acetone and water.

EXAMPLE IV

*α-Methyl-β-(3,5-diiodo-4-hydroxyphenyl) propionic acid*

The α-methyl p-hydroxy cinnamic acid required for the preparation of this diiodo acid can be prepared from either p-anisaldehyde or p-hydroxy benzaldehyde with propionic anhydride and anhydrous potassium propionate (Organic Reactions, vol. I, p. 251; John Wiley & Sons, New York, 1942). 48.8 g. (0.4 m.) of p-hydroxy benzaldehyde, 52.4 g. (0.4 m.) of freshly fused potassium propionate and 200 cc. of propionic anhydride were heated for a period of 30–35 hours at 135° with stirring. The reaction mixture, after pouring into water, was extracted with ether and the ether extract treated with sodium carbonate solution. The α-methyl-p-hydroxy cinnamic acid was obtained by acidification of the sodium carbonate extract and after recrystallization from water, melted at 204–204.5° C.

Reduction of the α-methyl-p-hydroxy cinnamic acid with Raney's alloy and aqueous alkali (J. Org. Chem. 9, 175 (1944)) gave α-methyl-β-(p-hydroxy phenyl) propionic acid which after recrystallization from water, melted at 102–102.5° C.

The α-methyl-β-(p-hydroxyphenyl) propionic acid was iodinated as described in Example I and yielded the α-methyl-β-(3,5-diiodo-4-hydroxyphenyl) propionic acid which after recrystallization from chloroform-petroleum ether, melted at 118–119° C.

EXAMPLE V

*β-Methyl-β-(3,5-diiodo-4-hydroxyphenyl) propionic acid*

By the Reformatsky reaction between p-methoxy acetophenone, ethyl brom acetate and zinc (Ber. 50, 1273 (1917)) there was obtained β-methyl-p-methoxy cinnamic acid, B. P. 140–144°/3 mm.

Reduction of this acid with Raney's alloy and aqueous alkali gave the β-methyl-β-(p-methoxy phenyl) propionic acid which after recrystallization from petroleum ether melted at 66.5–67.5° C.; methyl ester B. P.=132°/5 mm.

Demethylation of the β-methyl-β-(p-methoxy phenyl) propionic acid with hydrobromic and acetic acids as described in Example I, yielded the β-methyl-β-(p-hydroxyphenyl) propionic acid which on recrystallization from water melted at 135–137° C.

The β-methyl-β-(p-hydroxyphenyl) propionic acid was iodinated as described in Example I, and after recrystallization from chloroform-petroleum ether, melted at 121–123° C.

EXAMPLE VI

*ω-(p-Hydroxy phenyl) hexoic acid*

This intermediate for the preparation of the diiodo compound of Example II was obtained in the following manner:

To an ice-cold mixture of 54 g. of anisol and 200 g. of carbon disulfide there were added gradually and with stirring 75 g. of aluminum chloride. It is desirable to add the aluminum chloride slowly in order to avoid hydrolysis of the methyl ether. To this mixture was then added dropwise and preferably at 0° C. a mixture of 100 g. of α-carboethoxy valeryl chloride. After the addition the mixture was stirred for a few hours and decomposed with ice and HCl in the usual manner. The carbon disulfide layer was separated, washed with water and with sodium carbonate, and the carbon disulfide was then removed. The residue was saponified with sodium hydroxide and the acidic portion freed of any neutral material. On acidification of the sodium carbonate extract the Δ-(p-anisoyl) valeric acid was obtained in a yield of 90 g., melting at 105–121° C. Recrystallization from benzene-petroleum ether yielded 88 g. melting at 128–129°. Substitution of acetylene tetrachloride for carbon disulfide gives slightly higher yields.

The keto acid so obtained was then reduced and demethylated in the manner described in Example III, yielding ω-(p-hydroxy phenyl) hexoic acid.

EXAMPLE VII

*Ethyl γ-(3,5-diiodo-4-hydroxy phenyl) butyrate*

A mixture of 10 g. of γ-(3,5-diiodo-4-hydroxy phenyl) butric acid was esterified with absolute ethyl alcohol by any of the known methods. The ester after purification through the sodium bicarbonate extraction, was recrystallized from petrol ether using decolorizing carbon. After further recrystallization from petroleum ether, the ethyl ester melted at 42–43° C.

EXAMPLE VIII

*ω-(3,5-diiodo-4-acetoxy phenyl) hexoic acid*

10 g. of ω-(3,5-diiodo-4-hydroxy phenyl) hexoic acid, prepared from ω-(p-hydroxy phenyl) hexoic acid by iodination in the manner described in Example I, were acetylated with acetic anhydride using a few drops of sulfuric acid as catalyst. After standing over night, the reaction mixture was poured into water and the acetoxy compound extracted with ether. The ether solution was extracted with sodium bicarbonate and after neutralizing with HCl was treated with charcoal. The bicarbonate solution after filtration from the charcoal was cooled and acidified with HCl. The acetoxy compound was filtered and recrystallized from benzene and petroleum ether and melted at 52–54° C.

EXAMPLE IX

*α-Ethyl β-(3,5 diiodo-4-hydroxy phenyl) propionic acid*

A mixture of 61 g. of p-hydroxy benzaldehyde, 52 g. anhydrous sodium butyrate and 306 g. of butyric anhydride was heated with stirring at 145° to 150° C. for approximately 35 to 45 hours. After cooling to approximately 60° C., the excess anhydride was cautiously decomposed with water. The resulting mixture was poured on ice and allowed to stand over night. The semi-solid cake was taken up in ether, the ether solution extracted with sodium carbonate, and the sodium carbonate extracts acidified to Congo red paper with hydrochloric acid. The resulting acidified solution was steam-distilled to remove the excess butyric acid and the steam-distillation residue cooled. The crude α-ethyl p-hydroxy cinnamic acid was recrystallized from water. Melting point 153 to 154°.

The cinnamic acid was reduced with Raney alloy in alkaline solution to the corresponding α-ethyl β-(4-hydroxy phenyl) propionic acid. After recrystallization from benzene the propionic acid melted at 99–100° C. (corr.)

To 0.1 m. of the propionic acid in 800 cc. of N/2 sodium hydroxide solution there was added at room temperature with stirring 250 cc. of a solution containing 50.8 g. of KI and 50.8 of $I_2$. The resulting iodinated mixture was filtered through Super-Cel and acidified with sulfurous acid. A small quantity of hydrochloric acid was then added and the semi-solid diiodo compound filtered. It was then dissolved in ether, and after removing the ether, the residue was recrystallized from carbon tetrachloride; M. P. 109.5–110.5°. Further purification may be conducted by dissolving the diiodo acid in sodium bicarbonate solution and recrystallizing again from carbon tetrachloride.

EXAMPLE X

α-Butyl β-(3,5 diiodo-4-hydroxy phenyl) propionic acid

A mixture of 61 g. of p-hydroxy benzaldehyde, 69 g. of anhydrous sodium caproate and 350 g. of caproic anhydride was heated with stirring from 45 to 50 hours at 135°–145° C. The reaction product was worked up exactly as described for the corresponding α-ethyl compound of Example IX. The crude α-butyl acid after recrystallization from benzene-petroleum ether melted at 123°–124° C. (corr.)

The cinnamic acid was reduced with Raney alloy and aqueous alkali and the purified propionic acid melted at 94°–95° C. after recrystallization from benzene-petroleum ether.

Iodination of the propionic acid was carried out as described for the α-ethyl compound in Example IX, and after recrystallization from a mixture of ether-petroleum ether melted at 86°–87° C. Further purification of this acid may be accomplished by dissolving in sodium bicarbonate solution and subsequent precipitation with acid and recrystallization from ether-petroleum ether.

In place of anhydrous sodium caproate, the corresponding potassium salt may be used with equal ease. Corresponding substitution can be made in Example IX.

EXAMPLE XI

α-(n-Amyl) β-(4-hydroxy 3,5-diiodo phenyl) propionic acid

A mixture of 30.5 g. p-hydroxy benzaldehyde, 38 g. of anhydrous sodium heptylate and 200 cc. of heptylic anhydride was heated at 145° to 150° C. for 35 to 45 hours. The reaction mixture was worked up exactly as described for the compound of Example IX and the α-(n-amyl) p-hydroxy cinnamic acid after recrystallization from benzene melted at 131° to 131.5° C.

The reduction and iodination of this intermediate follow the procedures described in Example IX.

EXAMPLE XII

α-(n-Hexyl) β-(3,5-diiodo-4-hydroxy phenyl) propionic acid

A mixture of 67 g. of p-hydroxy benzaldehyde, 83 g. of anhydrous sodium caprylate and 405 g. of caprylic anhydride was heated for 35–45 hours at 145°–150° C. with stirring. The reaction mixture was worked up as described in Example IX and the α-(n-hexyl) p-hydroxy cinnamic acid after recrystallization from carbon tetrachloride melted at 123.5 to 124.5° C.

The reduction to the corresponding propionic acid and iodination proceed along the lines set out in Example IX.

EXAMPLE XIII

α-(n-Octyl) β-(3,5-diiodo-4-hydroxy phenyl) propionic acid

A mixture of 80.4 g. of p-hydroxy benzaldehyde, 139 g. of anhydrous potassium caprate and 644 g. of capric anhydride was heated for 45 to 50 hours at 155°–160° C. The reaction mixture was worked up as described in Example IX to yield the intermediate α-(n-octyl) 4-hydroxy cinnamic acid melting at 108.5° to 109° after recrystallization from a mixture of chloroform and petroleum ether.

The conversion to the diiodo compound is effected in the same manner as described hereinabove.

We claim:
Crystalline ω-(3,5-diiodo-4-hydroxy phenyl) hexoic acid.

References Cited in the file of this patent
UNITED STATES PATENTS

| Number | Name | Date |
|---|---|---|
| 2,345,384 | Dohrn et al. | Mar. 28, 1944 |
| 2,400,433 | Natelson et al. | May 14, 1946 |

OTHER REFERENCES

Bougault: Beilstein (Handbuch, 4th ed.), vol. 10 f. 247 (1927).